United States Patent

[11] 3,581,004

[72] Inventor Arthur A. Hagstrom
 Hoffman Estates, Ill.
[21] Appl. No. 770,159
[22] Filed Oct. 24, 1968
[45] Patented May 25, 1971
[73] Assignee Teletype Corporation
 Skokie, Ill.

[54] INVERTED SELECTOR MECHANISM
 2 Claims, 4 Drawing Figs.
[52] U.S. Cl. ................................................. 178/33
[51] Int. Cl. ............................................ H04l 17/16
[50] Field of Search ........................................ 178/33

[56] References Cited
UNITED STATES PATENTS
2,595,745  5/1952  Zenner .......................... 178/33

Primary Examiner—Kathleen H. Claffy
Assistant Examiner—Thomas W. Brown
Attorneys—J. L. Landis and R. P. Miller ABSTRACT: A selector mechanism including a line relay, a selector magnet, circuitry controlled by the line relay for energizing the selector magnet whenever the line relay is deenergized and vice versa, and means controlled by the selector magnet for producing a marking output whenever the selector magnet is deenergized and for producing a spacing output whenever the selector magnet is energized.

PATENTED MAY 25 1971 3,581,004

INVENTOR
ARTHUR A. HAGSTROM

BY Michael A. O'Neil
ATTORNEY

INVERTED SELECTOR MECHANISM

BACKGROUND OF THE INVENTION

Telegraph receivers and other signal-responsive devices almost universally employ a selector magnet and an armature operated thereby for converting incoming electrical signals into mechanical movements. In the early days of telegraphy selector magnets were connected directly to telegraph lines, however, it soon became the practice to connect a highly responsive line relay to the line and to use the line relay to control a selector magnet energizing circuit. Traditionally telegraph signals include a no current start bit and a current stop bit and, accordingly, line relays responding to such signals remain energized during idle periods. In the past the selector-magnet-driving circuits controlled by line relays have been arranged to energize their respective selector magnets whenever their respective line relays are energized, that is, to operate the selector magnets as if they were connected directly to the incoming line. This practice causes the selector magnets of low usage telegraph receivers to remain energized for long periods of time thereby creating an unnecessary power drain in the selector-magnet-driving circuits of such devices and also causing the armatures of such selector magnets to tend to "stick" due to accumulations of oil and residual magnetism, both of which conditions are aggravated by long periods of selector magnet energization. Simply reversing the selector-magnet-driving circuits of low usage telegraph receivers so that the selector magnet is deenergized whenever the line relay is energized without also reversing the output of the selector magnet is an inadequate solution since it would require the complete redesign of all such low usage receivers.

SUMMARY OF THE INVENTION

In the preferred embodiment a selector mechanism in which the selector magnet is deenergized during idle periods is comprised of means for receiving signals including start bits and stop bits, a selector magnet, circuitry responsive to the receiving means for energizing the selector magnet whenever a start bit is received and for deenergizing the selector magnet whenever a stop bit is received and means responsive to the selector magnet for providing an output indicative of the receipt of a start bit whenever the selector magnet is energized and for providing an output indicative of the receipt of a stop bit whenever the selector magnet is deenergized.

DESCRIPTION OF THE DRAWING

A more complete understanding of the invention may be had by referring to the following detailed description when taken in conjunction with the drawing wherein.

DETAILED DESCRIPTION

Figure 1:
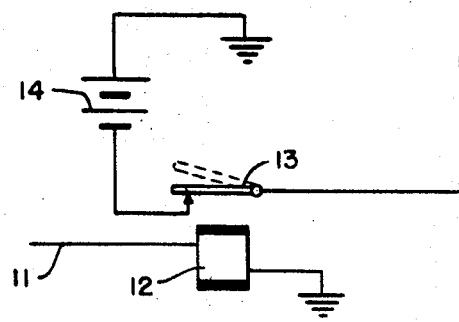
FIG. 1 a schematic illustration of a conventional selector mechanism.
Figure 1:
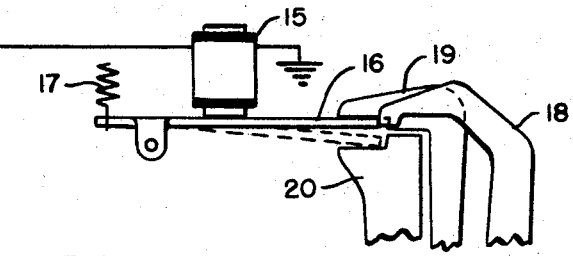

Referring now to the drawing, wherein like reference numerals designate like parts throughout the several views, and referring particularly to FIG. 1, there is shown a telegraph line 11 extending from a remote transmitter (not shown), such as a tape reader, a keyboard, or the like, to a line relay 12. The telegraph line 11 conveys signals comprised of current (marking) bits and no current (spacing) bits which serve to energize and deenergize the line relay 12, respectively. The line relay 12 operates an armature 13 which is normally positioned in the dash line position in FIG. 1 and which is driven to the full line position whenever the line relay 12 is energized. The armature 13 operates to connect a source of electrical potential 14 to a selector magnet 15. Accordingly, the selector magnet 15 is energized by the source of potential 14 whenever the line relay 12 is energized by a marking bit on the line 11.

The selector magnet 15 operates to control the positioning of a selector magnet armature 16 which is normally driven to the dash line position shown in FIG. 1 by a spring 17 and which is driven to the full line position shown in FIG. 1 against the action of the spring 17 whenever the selector magnet 15 is energized. The selector magnet armature 16 controls the positioning of a start lever 18, a spacing lock lever 19 and a marking lock lever 20 which together form the output of the selector mechanism.

In use, the telegraph line 11 is maintained in a current or marking condition during all idle or rest periods. Accordingly, during such periods, the line relay 12 is maintained in an energized condition, the line relay armature 13 is held in the full line position shown in FIG. 1, the source of potential 14 is connected through the armature 13 to the selector magnet 15 and the selector magnet armature 16 is held in the full line position shown in FIG. 1 due to the energization of the selector magnet 15. During rest periods the start lever 18 is driven against the end of the selector magnet armature 16 by a spring (not shown) and the spacing lock lever 19 and the marking lock lever 20 are held out of engagement with the armature 16 by a cam (not shown).

Telegraph signals traditionally begin with a spacing pulse and, accordingly, whenever a signal is received by the selector mechanism a no current bit is delivered through the telegraph line 11 to the line relay 12. The spacing bit deenergizes the line relay 12 thereby allowing the line relay armature 13 to return to the dash line position shown in FIG. 1. This disconnects the source of potential 14 from the selector magnet 15 which in turn allows the selector magnet armature 16 to move from the full line position shown in FIG. 1 to the dash line position shown therein under the action of the spring 17. When the selector magnet armature 16 moves to the dash line position the start lever 18 immediately moves toward the selector magnet armature 16 which action indicates the rotation of a selector cam shaft (not shown). As the selector cam shaft begins its rotation the start lever 18 is cammed away from the selector magnet armature 16 and the spacing lock lever 19 and the marking lock lever 20 are permitted to move toward the selector magnet armature 16 under the action of springs individual to them (not shown).

Telegraph signals include a plurality of intelligence bits, which may be either marking or spacing bits, that are transmitted over the telegraph line 11 to the line relay 12 immediately after the spacing start bit. The selector cam shaft includes a flutter cam which permits the spacing lock lever 19 and the marking lock lever 20 to move toward the selector magnet armature 16 during the receipt of each intelligence bit and which cams the levers 19 and 20 away from the armature 16 at the end of each intelligence bit. If a particular bit is marking, the line relay 12 is energized, the source of potential 14 is connected to the selector magnet 15, and the selector magnet armature 16 is moved to the full line position shown in FIG. 1. As the spacing lock lever 19 and the marking lock lever 20 move toward the selector magnet armature 16 the spacing lock lever 19 is blocked while the marking lock lever 20 is permitted to move freely toward the armature 16 under the action of its spring. If a particular bit is spacing, on the other hand, the line relay 12 is deenergized, the source of potential 14 is disconnected from the selector magnet 15 and the selector magnet armature 16 is driven to the dash line position shown in FIG. 1 by the spring 17. Accordingly, as the spacing lock lever 19 and the marking lock lever 20 are permitted to move toward the selector magnet armature 16 the marking lock lever 20 is blocked while the spacing lock lever 19 is permitted to move freely under the action of its spring. Various levers (not shown) are controlled by the operation of the spacing lock lever 19 and the marking lock lever 20 and serve to operate a telegraph mechanism in accordance with the received signal.

Traditionally telegraph signals invariably end with a marking stop bit which operates to energize the line relay 12, thereby connecting the source of potential 14 to the selector magnet 15 which in turn moves the selector magnet armature 16 to the full line position shown in FIG. 1. During the receipt of the stop bit the selector cam finishes its cycle of rotation and during the terminal portion of its rotation operates to cam the spacing lock lever 19 and the marking lock lever 20 away from the selector magnet armature 16 and to permit the start lever 18 to engage the end of the selector magnet armature 16. This action returns the selector mechanism to its rest condition.

The mechanism shown in FIG. 1 operates very well and would be perfectly satisfactory were it not for the fact that the mechanism shown in FIG. 1 maintains the selector magnet 15 in an energized condition during rest periods. This causes a power drain which can be excessive in low usage of teletypewriters. The selector mechanisms shown in FIGS. 2 and 4 operate to overcome this disadvantage while providing exactly the same output as the mechanism shown in FIG. 1 so that the parts of the teletypewriter controlled by the selector mechanism are not affected in any way whatsoever.

Figure 2:
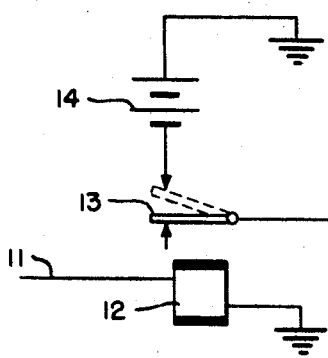
FIG. 2 is a schematic illustration of one embodiment of the present invention.
Figure 2:
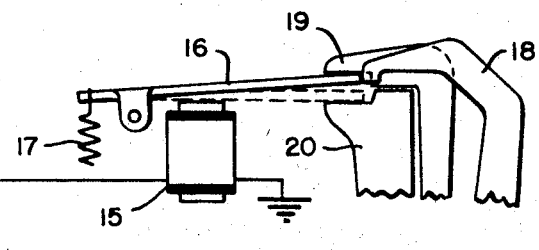
Figure 3:
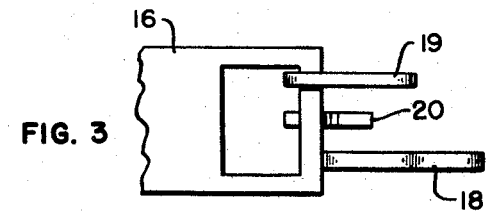
FIG. 3 is a partial top view of the selector mechanism shown in FIGS. 1 and 2.

Referring now to FIG. 2 and comparing the selector mechanism shown therein with the selector mechanism shown in FIG. 1, it will be seen that the two mechanisms are identical except for two very important details. First, the selector magnet 15 of the selector mechanism shown in FIG. 2 is positioned to drive the selector magnet armature 16 to its dash line position while the spring 17 is positioned to drive the armature 16 to its full line position. Second, the line relay armature 13 is arranged to connect the source of potential 14 to the selector magnet 15 whenever the line relay 12 is deenergized and to disconnect the selector magnet 15 from the source of potential 14 whenever the line relay 12 is energized. Thus, during the rest condition the selector magnet 15 is deenergized but the armature 16 is maintained in its full line position by the spring 17, that is, the armature 16 is maintained by the spring 17 in the same position in which the armature 16 of the device shown in FIG. 1 is maintained by the selector magnet 15.

Whenever a spacing bit is received by the device shown in FIG. 2 the relay 12 is deenergized and the armature 13 connects the source of potential 14 to the selector magnet 15 which in turn drives the selector armature 16 to its dashed line position against the action of the spring 17. Whenever a marking bit is received the relay 12 disconnects the source of potential 14 from the magnet 15 and the spring 17 drives the armature 16 to its full line position. The start lever 18, the spacing lock lever 19 and the marking lock lever 20 operate with respect to the selector magnet armature 16 in a manner identical to their manner of operation with respect to the armature 16 of the device shown in FIG. 1 and, accordingly, the selector mechanism shown in FIG. 2 operates to provide an output identical to the output provided by the selector mechanism shown in FIG. 1 without the necessity of a power drain through the selector magnet 15 during rest periods.

Figure 4:
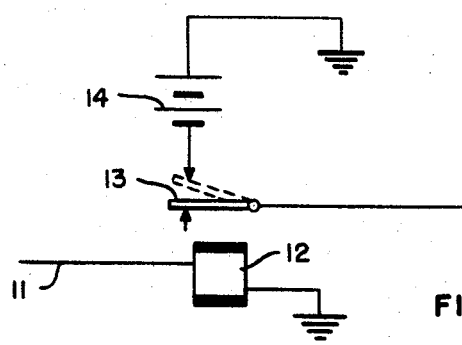
FIG. 4 is a schematic illustration of another embodiment of the present invention.
Figure 4:
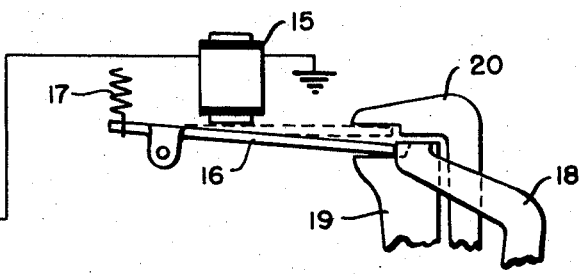

Referring now to FIG. 4 there is shown a selector mechanism that provides the results provided by the mechanism shown in FIG. 2 in a somewhat different manner. The line relay armature 13 is again arranged to connect the source of potential 14 to the selector mechanism 15 whenever the line relay 12 is deenergized and to disconnect the source of potential 14 from the selector magnet 15 whenever the line relay 12 is energized. The selector magnet 15, however, is arranged in the manner shown in FIG. 1, that is, the selector magnet 15 is positioned to raise the selector magnet armature 16 to the dash line position shown in FIG. 4 whenever it is energized while the spring 17 is arranged to drive the selector magnet armature 16 to the full line position whenever the selector magnet 15 is deenergized. Thus the selector magnet 15, the selector magnet armature 16 and the spring 17 are arranged in a manner identical to their arrangement in FIG. 1.

In order to provide an output identical to the output of the selector mechanism shown in FIG. 1 without the requirement of the energization of the selector magnet 15 during idle periods the levers 18, 19 and 20 shown in FIG. 4 are arranged to respond to opposite positioning of the selector magnet armature 16. Thus, the start lever 18 is arranged to move under the armature 16 whenever the armature 16 moves to its dash line position under the action of the selector magnet 15 rather than to move over the armature 16 whenever the selector magnet armature 16 moves to its full line position under the action of the spring 17 as is the case in the selector mechanism shown in FIG. 1. Similarly, the armature-engaging portion of the spacing lock lever 19 of the selector mechanism shown in FIG. 4 is arranged identically to the armature-engaging portion of the marking lock lever 20 of the selector mechanism shown in FIG. 1 so that the spacing lock lever 19 of the selector mechanism shown in FIG. 4 is blocked from leftward movement whenever the armature 16 is in its full line position. Likewise, the armature-engaging portion of the marking lock lever 20 of the selector mechanism shown in FIG. 4 is arranged identically to the armature-engaging portion of the spacing lock lever 19 of the selector mechanism shown in FIG. 1 so that the marking lock lever 20 of the selector mechanism shown in FIG. 4 is blocked from leftward movement whenever the armature 16 is in its dash line position. Because the armature 13 connects the source of potential 14 to the selector magnet 15 whenever the relay 12 is deenergized and disconnects the source 14 from the magnet 15 whenever the relay 12 is energized the selector magnet armature 16 of the selector magnet shown in FIG. 4 is positioned in its dash line position during spacing bits and is positioned in its full line position during marking bits. Therefore, since they are arranged to respond to opposite armature positions from those they respond to in the device shown in FIG. 1 the levers 18, 19 and 20 operate to provide an output identical to the output of the levers 18, 19 and 20 of the selector mechanism shown in FIG. 1 even though the selector magnet 15 of the selector mechanism shown in FIG. 4 is deenergized during idle periods.

Although only two embodiments of the invention are illustrated in the drawing and are described in the foregoing specification it will be understood that various other embodiments can be designed and that various modifications of the embodiments shown can be provided without departing from the spirit of the invention.

I claim:

1. In a telegraph selector-magnet-energizing circuit for controlling the movement of a selector magnet armature from a first position engaging a spacing lock lever of a selector mechanism to a second position engaging a marking lock lever of the selector mechanism in response to a no-current signal condition impressed on a normally energized transmission line:

resilient means for urging the selector magnet armature into the first position to engage the spacing lock lever;

a selector magnet for moving the selector magnet armature from the first position to the second position;

a circuit means including a contact movable from an open position to a closed position for energizing said selector magnet to move the selector magnet armature into engagement with the marking lock lever; and a line relay connected to the transmission line and normally energized for holding said contact in the open position to maintain said selector magnet deenergized and said selector magnet armature in the first position, and said line relay responsive to a no-current signal condition on the transmission line for releasing said contact to move and complete said circuit means to energize the selector magnet to move the selector magnet armature into engagement with the marking lock lever.

2. A telegraph signal selector mechanism including a start lever, a spacing lock lever, a marking lock lever, a selector magnet armature mounted to pivot from a position engaging the start lever and the spacing lock lever to a position engaging the marking lock lever, a relay armature mounted to pivot from a first to a second position, and a line relay connected to a transmission line for moving the relay armature into the first position in response to a current flow in the transmission line, wherein the improvement comprises:
 resilient means connected to the selector magnet armature for urging the selector magnet armature to engage the start lever and the spacing lock lever;
 a selector magnet means for moving the magnet armature to engage the marking lock lever; and circuit means responsive to the movement of the relay armature for applying a current to said selector magnet means when the relay armature is in the second position and for interrupting the current to said selector magnet means upon movement of the relay armature to the first position.